June 23, 1942.  O. U. ZERK  2,287,404
MOBILE COLD STORAGE AND REFRIGERATING APPARATUS
Filed May 3, 1938  6 Sheets-Sheet 1
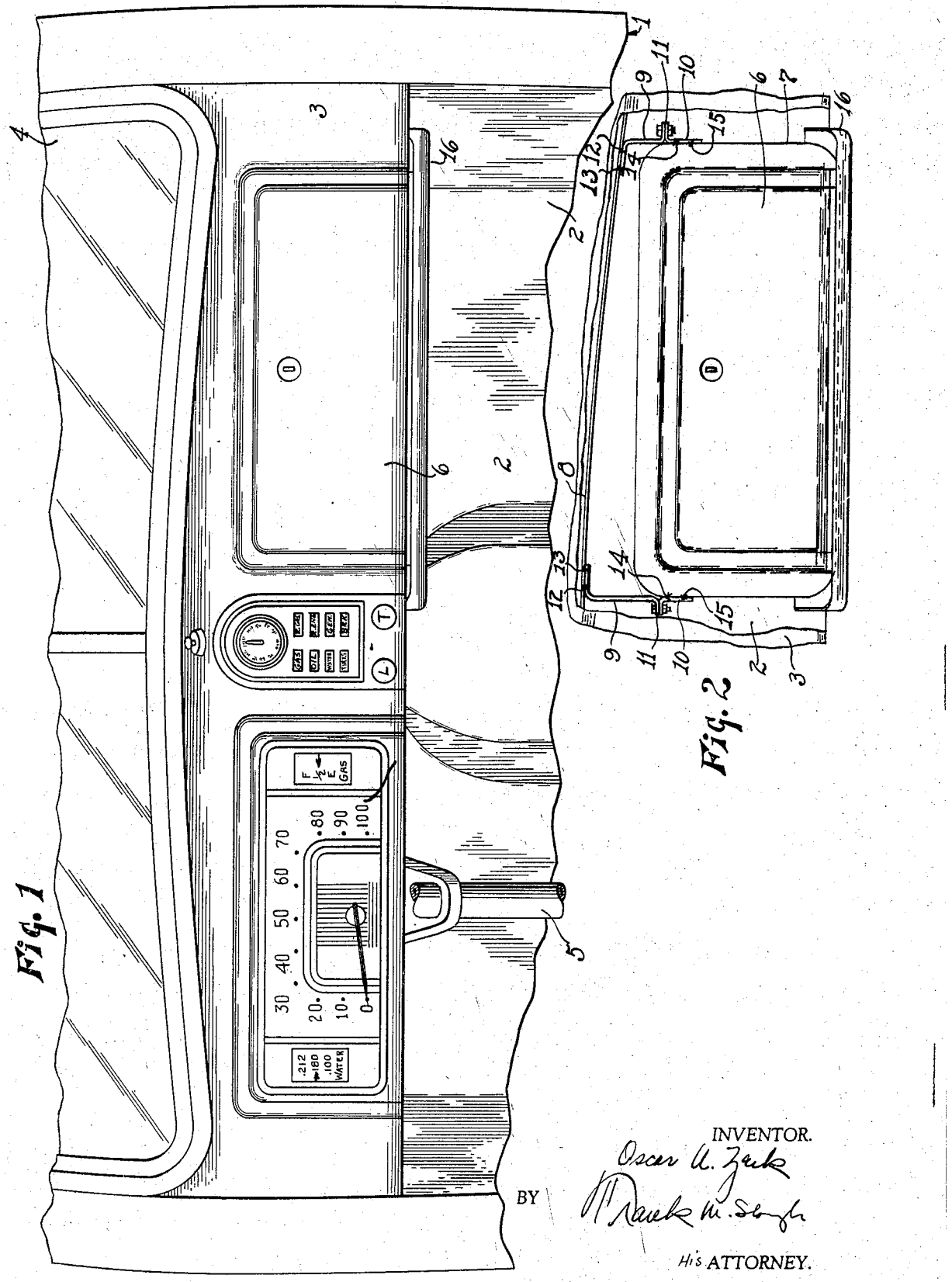
INVENTOR.
Oscar U. Zerk
BY
His ATTORNEY.

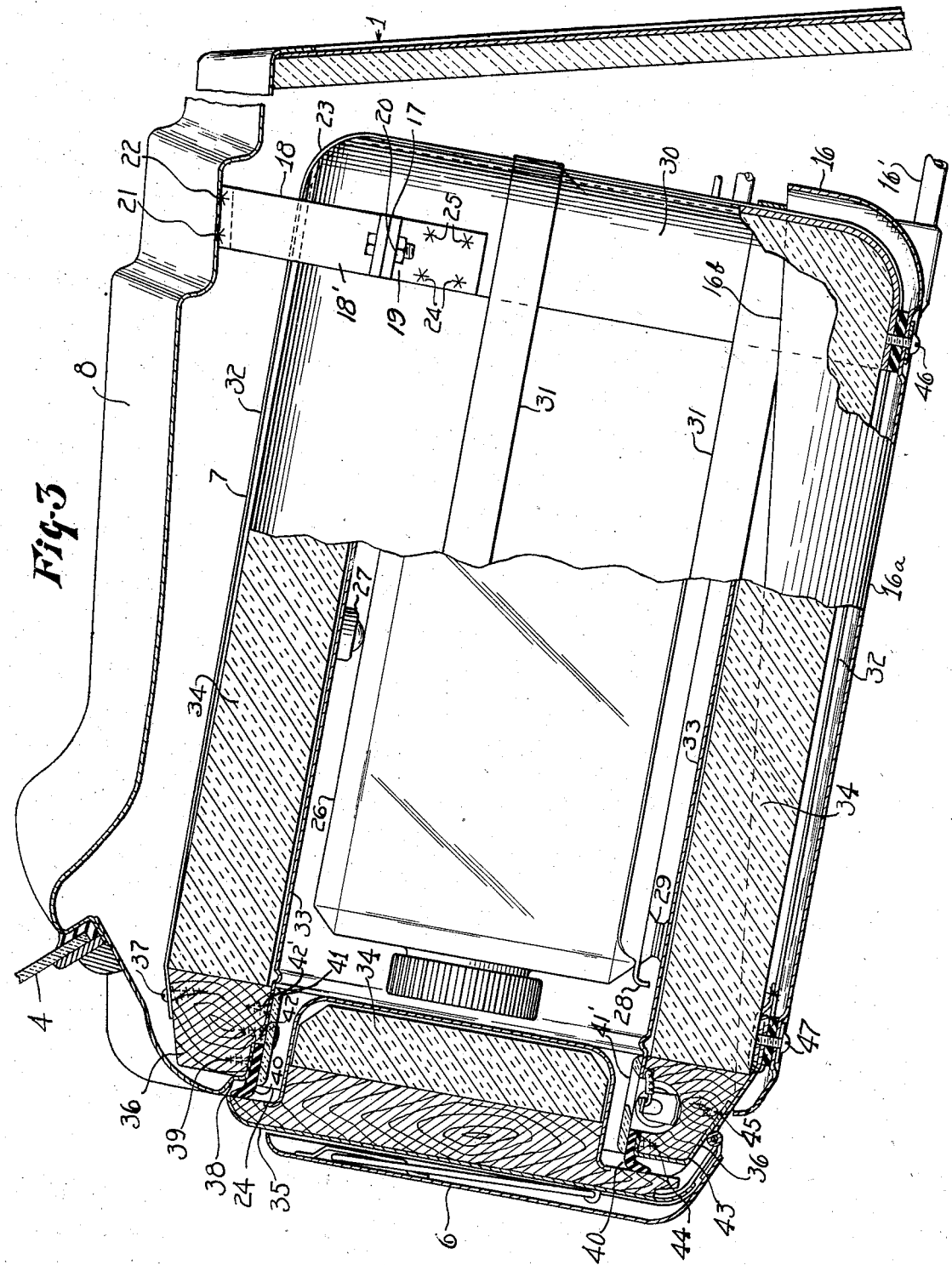

June 23, 1942.  O. U. ZERK  2,287,404
MOBILE COLD STORAGE AND REFRIGERATING APPARATUS
Filed May 3, 1938  6 Sheets-Sheet 3

INVENTOR.
Oscar U. Zerk
BY Frank M. Slough
His ATTORNEY.

June 23, 1942.　　　O. U. ZERK　　　2,287,404
MOBILE COLD STORAGE AND REFRIGERATING APPARATUS
Filed May 3, 1938　　　6 Sheets-Sheet 4

INVENTOR.
Oscar U. Zerk
BY Frank M. Slough
His ATTORNEY.

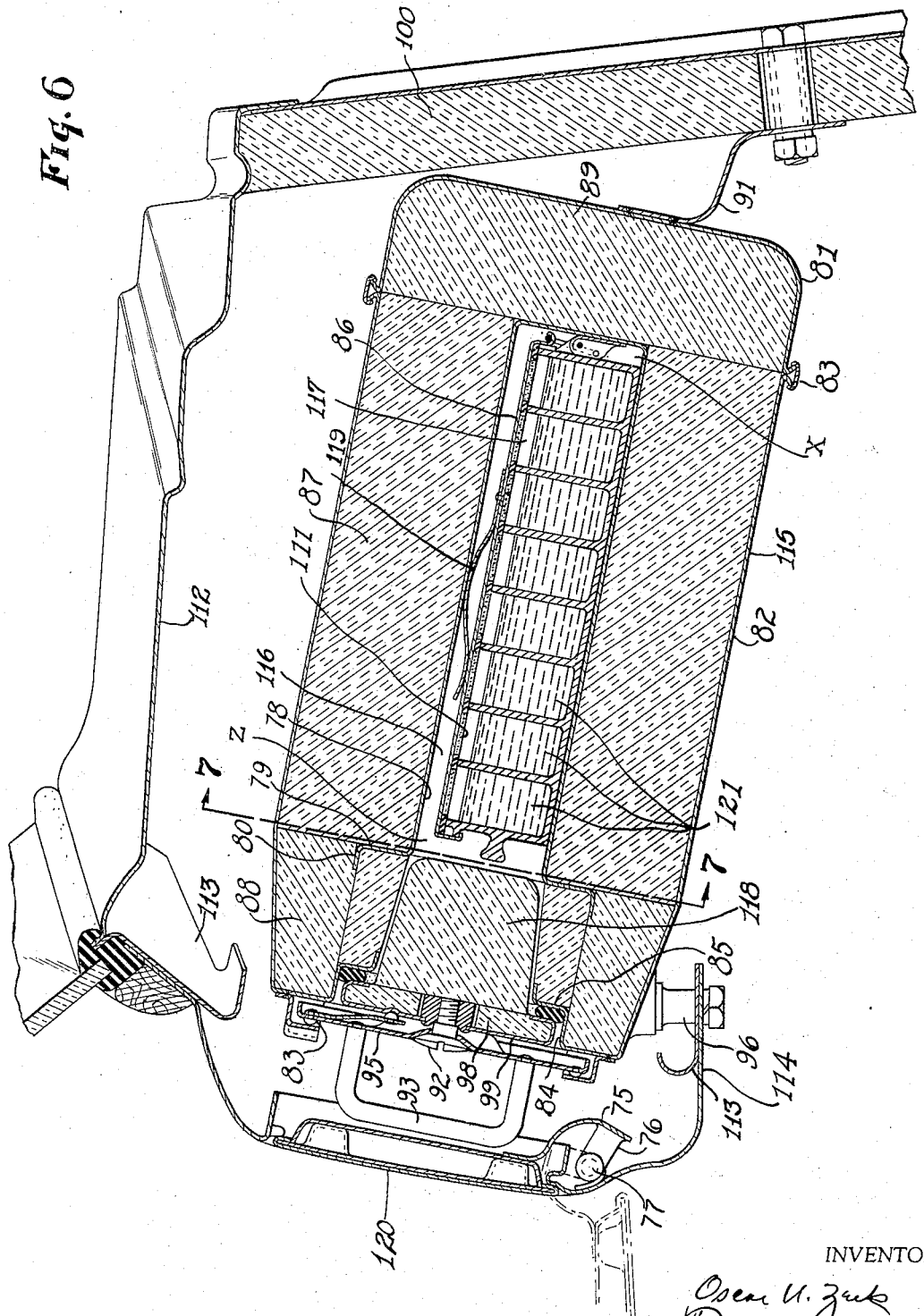

Patented June 23, 1942

2,287,404

UNITED STATES PATENT OFFICE 2,287,404

MOBILE COLD STORAGE AND REFRIGERATING APPARATUS

Oscar U. Zerk, Chicago, Ill.

Application May 3, 1938, Serial No. 205,707

8 Claims. (Cl. 62—117)

My invention relates to cold storage and refrigerating apparatus and relates more particularly to cold storage and refrigerating apparatus primarily adapted to an automotive vehicle.

The application of either cold storage or refrigeration to moving vehicles, such as automotive vehicles, presents problems which differ from those encountered in stationary cold storage or refrigeration systems, some of which are related in my earlier filed applications Serial No. 29,332 and Serial No. 29,333.

Other apparent difficulties result from the fact that automobiles commonly are so constructed as to leave very little desirable space available for the placement of a refrigerator, or other heat insulated cold storage cabinet of sufficient size and of satisfactory capacity, when installed in a position readily accessible from the front or driver's seat of the vehicle.

I have found that the most desirable position for a refrigerator or cold storage cabinet is forwardly of the instrument panel below the cowl, extending forwardly from the instrument panel toward the hood, and between said instrument panel and the wall separating the passenger and engine compartments, in the space normally occupied by the glove compartment, whereby access to the cabinet is provided through an opening in the instrument panel, as shown at present for access to the glove compartment.

However, making proper allowance for other equipment and foot room required for the passengers, and as limited by the form of the forwardly and downwardly inclined cowl of usual design, the horizontal and vertical space available is not only extremely limited, but its upper portion, being downwardly inclined from adjacent the instrument board toward the said partition wall, would seem to discourage any successful attempt at installations of automobile refrigerators or cold storage cabinets in the otherwise most desirable space.

This has been more particularly true since the usual type of horizontally disposed refrigerator included in said space would be of insufficient depth to provide thermo-circulation of air in the refrigerating compartment.

In the discussion of embodiments of my invention, disclosed herein, the foregoing disadvantages have been avoided and a commercially practical arrangement provided.

It is a primary object of my invention to provide a cold storage system primarily adapted to automotive vehicles.

Another object of my invention is to provide a cold storage system for automotive vehicles wherein a heat insulated cabinet for storing articles to be cooled is disposed in the space normally occupied by the glove compartment and is easily accessible from the driving compartment of the vehicle.

Another object of my invention is to effect the transportation of automobile refrigerator or cold storage cabinet contents in a substantially rattle-proof manner.

Another object of my invention is to provide a cold storage cabinet of a type adapted for use on and in connection with automotive vehicles which can be adapted for use in existing cars.

Another object of my invention is to provide a cold storage cabinet of a type well adapted for use on and in connection with automotive vehicles which can be easily detached therefrom.

Another object of my invention is to provide a cold storage cabinet of the type referred to, designed so that the contents of the cabinet may be easily displayed and easily accessible.

Another object of my invention is to overcome the disadvantages naturally inherent and resulting from the placement of a cold storage cabinet or refrigerator in a horizontal position, and at the same time achieve positive benefits from a different angular disposition of the cabinet relative to the surrounding adjacent parts of the automobile.

Another object of my invention is to more efficiently utilize space within the automobile passenger compartment for the installation of a cold storage or refrigerator cabinet of such form and in such manner and such position that maximum efficiency for the purpose is achieved.

Another object of my invention is to provide a cold storage or refrigerator cabinet of the type referred to, having improved air circulation when installed and in operation.

Another object of my invention is to provide a cold storage or refrigerator cabinet of the type referred to, which will not interfere in any way with the operation of the automotive vehicle in which it is placed, and which will not interfere with any of the parts thereof when in operation, or with any occupants of the said automotive vehicle.

Another obpject of my invention is to provide in a refrigerator cabinet of the type referred to, means for securing the refrigerator cabinet to the automotive vehicle in an improved relation thereto.

Another object of my invention is to provide a heat insulated cabinet of the type referred to, which may either have an evaporator associated therewith for use in a refrigerating system, or without such evaporator, permitting articles placed in storage compartments thereof, to be maintained within a desired range of temperature for extended periods of time.

Another object of my invention is to provide a cold storage cabinet of the type referred to, which will be economical to manufacture and efficient in use.

Another object of my invention is to provide in a unitary structure, a suitable heat insulated refrigerator and a motor driven compressor refrigerating apparatus, both unitarily installed on an automotive vehicle in a manner which is unobjectionable, and readily accessible for use and maintenance.

Another object of my invention is to provide a refrigerant system for automotive vehicles including a refrigerator cabinet and motor compressor-condenser unit which is relatively compact and which is adapted to be conveniently mounted beneath the cowl in the driving compartment of the vehicle.

With these and other objects in view, the invention resides in certain novel construction and combination and arrangement of parts, which will become increasingly apparent from a consideration of the following description and drawings, wherein:

Fig. 1 is a front elevational view of the instrument board of an automotive vehicle, to the rear of which the refrigerator cabinet of my invention is installed in such manner as to be made accessible, through a door on said instrument board.

Fig. 2 is a front elevational view of the refrigerator cabinet of my invention, with the front of the automobile instrument board of Fig. 1 broken away and illustrating the manner of securing the said refrigerator cabinet to the automobile below the automobile cowl, and between the engine and passenger compartment.

Fig. 3 is a side elevational view, partially in section, of an embodiment of my invention corresponding to that of the foregoing figures showing means to fasten the refrigerator cabinet to the instrument board and the automobile cowl, and further illustrating a container for foods or beverages disposed therein, and the manner of retaining the same in the cabinet in a vibration-proof manner.

Figure 4:
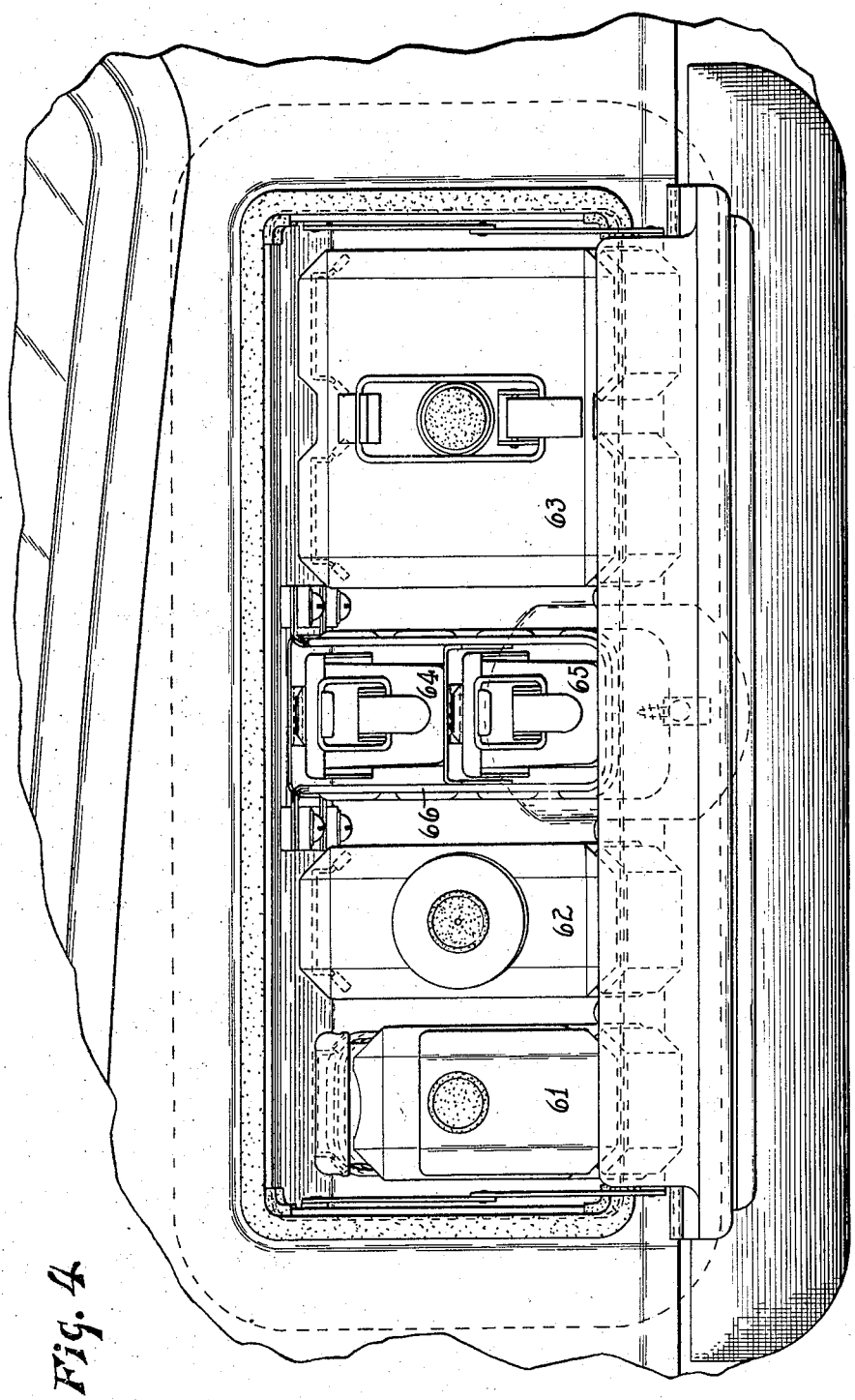

Fig. 4 is a front elevational view of an embodiment of my invention corresponding to that of the foregoing figures, with a front decorative and second heat insulated doors leading to the interior, in opened position exposing a typical arrangement of interiorly disposed cooling evaporator element, ice tray elements, and cold storage containers for food, beverages, and the like to be supplied therefrom in chilled condition.

Figure 5:
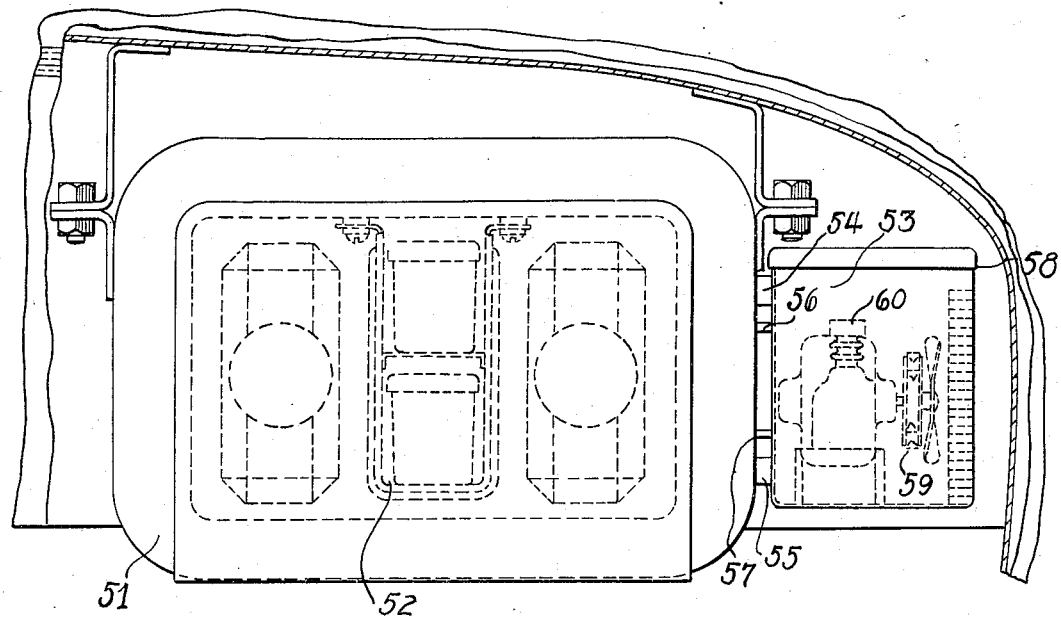

Fig. 5 illustrates a unitary installation of joined unitarily mounted and removable refrigerator cabinet and motor-compressor refrigerating apparatus, which is an embodiment of my invention, which otherwise may be of a construction corresponding largely to that of the foregoing figures.

Fig. 6 is a longitudinal medial sectional view through a heat insulated cold storage cabinet which is an embodiment of my invention, the cabinet being mounted beneath the cowl and between the instrument panel and dash of an automotive vehicle in a generally similar manner to that of the foregoing figures, but wherein no refrigerating evaporator is employed.

Figure 7:
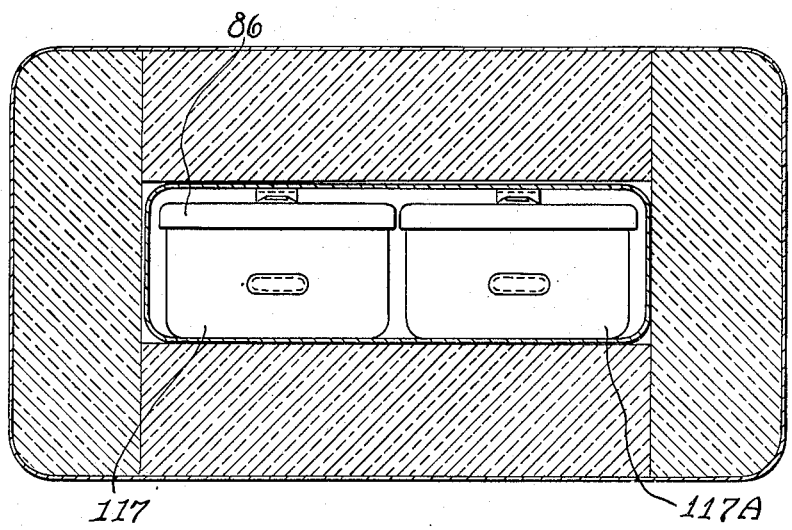

Fig. 7 is a sectional view of the cold storage cabinet of Fig. 6, the view being from the line 7—7 of Fig. 6 and towards the pair of ice containers, or trays, contained in said cabinet during typical heat storage use thereof.

Figure 8:
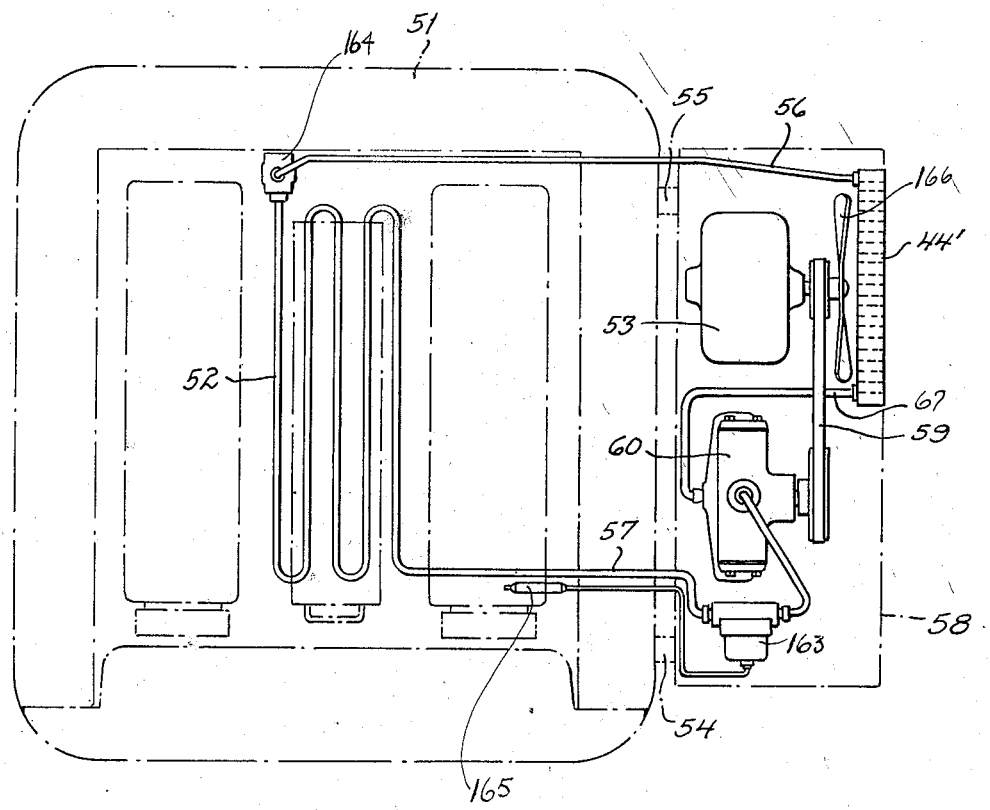

Fig. 8 is a top plan view of the refrigerant system of my invention.

Referring now to the drawings, the different figures of which are not drawn to the same scale as will be apparent, and in all of which like parts are designated by like reference characters, Fig. 1 is a view looking forwardly from within the passenger compartment of an automobile of any well known construction, illustrating at 2 the dash, at 3 the instrument board, at 4 the windshield, at 5 a portion of the steering column, the remainder of the steering column being broken away to better illustrate the instrument board, and at 8 the automobile cowl.

As is well understood the dash 2, is the generally vertical partition between the engine and passenger compartments of a conventional automobile; the cowl is that part of the body of the car which bridges the space between the top of the instrument board carrying the speedometer and other instruments facing the passenger seated in the car, and the hood which encloses the engine compartment; as used here the term "cowl" comprises the upper portion thereof supporting the windshield and from which the instrument board depends.

At 6, I show a door in the instrument board which is similar to that commonly used in present day passenger vehicles as a door to a "glove" compartment, but utilized in my invention as a decorative door to the heat insulated cabinet illustrated in its different forms in Figs. 2 to 7, inclusive.

My cabinet, it is to be noted, in its different forms is wider than its heighth, and preferably utilizes approximately the same depth as the glove compartment formerly occupied. The drip pan extends, in the forms shown in Figs. 1 and 2, a very short distance below the instrument panel.

In Figs. 1 and 2, a heat insulated cabinet 7 of my invention is shown disposed in the glove compartment position, as described, and this cabinet is secured to the instrument board and the cowl 8 by pair of brackets 9—9 and 10—10, disposed on either side of the cabinet 7 and bolted together as shown at 11, which are spot-welded or otherwise fastened to the cowl as shown at 12—12 and 13—13, and to the cabinet 7 as shown at 14 and 15 to suspend the cabinet 7 from the cowl 8.

The cabinet of my invention whether used as a refrigerator cabinet or as a heat insulated storage cabinet, as shown in Figs. 2 to 5 inclusive, 7, 8, 10, and 11, is secured to the automotive vehicle frame in a plurality of different ways, and to different parts thereof. Fig. 3 illustrates one of a pair of joined bracket means 17—17 similar to those employed as above described in connection with Fig. 2, each pair comprising a bracket 18 and a bracket 19 bolted together at 20, the upper bracket 18 of each pair of bracket means 17—17 at points such as 21 and 22 being welded to the said cowl 8 and the lower bracket 19 of each pair of bracket means 17—17 being welded at points such as 24 and 25, to the cabinet.

The bracket 18 of each pair of bracket means 17—17 is preferably curved, as shown at 18', to conform to each of the curved sides 23—23 of the cabinet 7, and its upper end is preferably bent back to engage the cowl and conform thereto.

Disposed within the cabinet 7 is a storage compartment within which a container 26 is disposed but preferably spaced from the interior walls thereof by spacing means, such as shown at 27, 28, and 29. The outer cover 30 of the refrigerator cabinet is preferably metallic and preferably transverse bands 31—31 and 32—32 are disposed thereover. Within the metal cover 30 of the refrigerator cabinet 7 and between the inner lining 33 and the metal cover 30 of the refrigerator cabinet, heat insulating material 34 is provided. Also heat insulating material 34 is used within the inner door 35 adjacent its inwardly projecting metallic face, which is of generally cup-shaped form.

In the form shown in Fig. 3, a circular wooden annulus 36 is placed around the forward edge of the refrigerator cabinet adjacent the inner face of the said inner door 35, and secured to the main portion of the cabinet 7 by screw means 37. A forwardly extending downwardly and inwardly projecting flange 38 of the cowl 8 is further secured as by screw means 39 to the lower portion of said wooden annulus 36.

Beneath the said flange of the cowl 8 is a rubber washer or annular ring 40, held thereagainst by means of an inner ring 41 of insulating material which is secured to said wooden annulus 36 by screw means 42. Said annular ring 40 also engages the inner door 35 at its outer peripheral edges and sealingly holds the same against the entry of air, etc., when the outer and inner doors 6 and 35 are closed.

The inner lining 33 of the refrigerator cabinet 7 is secured at its upper portion to the wooden annulus 36 as by screw means 42', and at its lower peripheral portion is retained between the annulus 36 and the inner ring 41, which is perforated at 41'.

A metal strip 43 of generally C-form is disposed over the outer lower edge of the wooden annulus 36, and secured thereto by screw means 44 and 45. The said rubber washer 40 is telescoped and retained between the said strip 43 and the said inner ring 41 of other insulating material.

The drip pan illustrated generally at 16 in Figs. 1 and 2, is also shown in Fig. 3 as attached to the refrigerator cabinet 7 of my invention by pins 46 and 47, and it is to be understood that the specific construction of the door means as shown in Fig. 3, and in other figures in the present application, as well as the specific construction of other portions of the cabinet, such as the container, disposed therein, the spring means utilized therefor, the drip pan, and the hinge means for the door, and other portions of the refrigerator, such as the evaporator, etc., are not claimed in the present application, being illustrated and described herein, only for the purpose of conveying a proper understanding of the invention hereof which involves a novel advantageous placement of a cold storage or refrigerator cabinet in an automobile or other automotive vehicle, in a highly efficient manner.

For the purposes of the present invention, however, it may be explained here that the drip pan 16 underlies at least the main portion of the refrigerator cabinet and like the cabinet proper is preferably inclined so that its outlet 16' in the lower end corner most remote from the door 35 receives by gravity the water resulting from any condensation of moisture from the ambient air contacting the outer surfaces of the cabinet walls, such water being led by the associated conduit 16' downwardly to discharge the same from the vehicle. While the drip pan 16 has its lower wall 16a inclined and in parallel relation to the bottom of the cabinet 7, the upper edge or rim 16b of the drip pan is preferably horizontal, for obvious reasons.

Fig. 4 illustrates merely a view to the rear of the cabinet closure door, shown as opened, to expose one desirable arrangement of containers 61, 62, and 63, for beverages, and 64 and 65 for ice trays; in this view a refrigerating evaporator coil is shown at 66.

The cabinet of my invention, as shown in all figures of the drawings, is of generally horizontally flattened form and is inclined from a normal horizontal position. It is preferably substantially rectangular in form, and provided with an opening at its forwardly disposed face, which may be covered by a hinging door or other suitable cover. In the embodiments of Figs. 1 to 4 inclusive, the door 35 is covered by an outer door 6, as described above, and in the form shown in Fig. 6 the cabinet opening is adapted to be closed by a plug closure which is spaced from the door in the instrument panel and in alignment therewith.

In Fig. 5 I show an embodiment of my invention comprising a refrigerator cabinet 51, suitably provided with containers and an evaporator, the latter at 52, substantially as in Fig. 8, but having a suitable motor compressor unit 53, supported by the cabinet 51, as by attaching the unit to the cabinet by connecting preferably heat insulating attachment means 54, and 55. At 56 and 57 are indicated conduits of the refrigerant fluid system interconnecting the compressor apparatus 53, with the evaporator 52.

The motor compressor unit 53 may be of any desired construction, but in the illustrated embodiment it comprises an electrical motor contained in a housing 58 driving, through a belt 59, a fluid compressor 60, whereby the fluid refrigerant is circulated through the system comprising the conduits 56 and 57, the evaporator 52, and other well known elements of such a system, not shown herein, but understood to be present whenever essential to practical operation, and it may be, for instance, of substantially the type and kind as illustrated in my recently issued Patent No. 2,191,102, dated February 20, 1940, the application for which was co-pending herewith, and which is more or less schematically illustrated as a plan view in Fig. 8 hereof.

In Fig. 8, the refrigerant system illustrated comprises a compressor 60 driven by a motor 53, which also operates a fan 166 to draw air through the interstices of a condenser 44' for cooling or condensing the charge of compressed refrigerant passing from the compressor 60 through the conduit 67 to said condenser. The refrigerant medium is carried from the condenser 44' to an expansion valve, generally shown at 164, through a conduit 56, expansion valves being well known in the refrigerator art, being employed therein to control the pressure at which the compressed and/or condensed refrigerant is supplied to the evaporator, illustrated in Fig. 8 at 52.

As is well known, in a closed system, as in the present system, and irrespective of the amount of liquid in the system, the expansion of gas is dependent upon a vapor pressure which can be controlled by the expansion valve 164 which may be of any suitable type. The expansion valve comprises a housing maintained sealed from the atmosphere, whereby the operation of the expansion valve will be effected without any varying effect caused by changes in atmospheric pressure, and therefore the temperature at the evaporator may be controlled within narrow limits.

I contemplate that various types of expansion valves other than those shown may be employed, such as a capillary tube or the like, the expansion valve 164 hereof being of the conventional metering valve type. A fluid from the evaporator 52 is returned through the conduit 57 and the evaporator valve 163, to the compressor 60, and the evaporator control valve 163. The passage of the refrigerant through the control valve 163 is throttlingly thermostatically controlled under the control of a thermostatic bulb 165 disposed within the refrigerator cabinet 51, and upon the temperature of the cabinet 60 rising above a predetermined maximum value, an expansible fluid in the bulb 165 will expand and exert pressure within an expansible element of the casing of the control valve 163 to force the throttling valve against the tension of a spring, not shown, to permit refrigerant fluid to pass from the evaporator to the compressor, and be circulated through the system, resulting in a lowering of temperature in the cabinet.

At a predetermined low temperature, the expansible material in said bulb and valve expansion element will contract, permitting the said spring to force the throttling valve element of the control valve 163 to a closed position as the pressure of said controlling fluid is reduced and the supply of refrigerant fluid to the compressor is cut off, whereby, because of the effect of ambient temperatures surrounding the casing 51, the temperature within said casing will gradually rise.

The system of Fig. 8, as above described, is taken merely for the purpose of example, and it will be understood that any conventional refrigerating system may be employed in connection with the elements of my invention as claimed herein, but in the above system described, the control elements are such that upon variation in speed of the compressor, the temperature within the refrigerator cabinet may be maintained within predetermined temperature limits, as more fully set forth in my aforesaid issued Letters Patent, wherein such a system is more fully illustrated and described.

The embodiment of my invention of the above described Fig. 5 has the advantage of combining in one unit, the motor-compressor apparatus 53, and the evaporator refrigerated heat insulated cabinet 51, whereby the former, preferably supported by the latter, may be installed or removed as a unit, and may be tested as a unit when removed. Also there is the additional important advantage of eliminating the necessity of providing long conduit lines between these parts of the system, with the attendant advantages of economy of material, parts, labor, and maintenance, and ready replacement.

Figs. 6 and 7 illustrate an embodiment of my invention which, with respect to the manner of use, is distinguished from embodiments heretofore described, each of which involves refrigeration of articles placed in the heat insulated cabinets, by evaporator means installed in such cabinets.

In the embodiment illustrated in Figs. 6 and 7, however, a heat insulated cabinet, which may be of relatively smaller size, is provided without any provision for refrigeration.

This form of the invention is especially applicable for use on automobile vehicles where the space provided below the cowl and between the instrument or like panel and dash is limited.

In the use of this embodiment, it is contemplated that articles placed in the cabinet shown generally at 115, will be pre-refrigerated, or pre-heated, before being placed in the cabinet. I contemplate in some cases, to accompany the use of such a cabinet by a co-operative installation, elsewhere conveniently located on the vehicle, of a separate refrigerator which, for instance, may be installed in the baggage compartment of the ordinary automobile.

In Fig. 6, the cabinet 115, installed to replace the usual glove compartment of an automobile instrument board, is not self-refrigerating and therefore is merely a heat insulated cabinet for storing articles previously refrigerated, or even previously heated, whereby such articles will be maintained at nearly the same temperature for a considerable period of time, and be ready for use at a desired subsequent time.

In the drawings of Figs. 6 and 7, I illustrate, for example, typical contents of a cabinet as comprising two ice trays, 117 and 117a, with liquid-tight sealed cover means, for a plurality of ice compartments.

From the foregoing, it will now be understood that in this embodiment of my invention, the cabinet 115 being heat-insulated by a considerable thickness of heat-insulating material 87, 88, 89, 118, etc., the contained articles retain substantially their original temperature and depart therefrom only slowly, and when trays 117 and 117a containing frozen ice units are placed in the cabinet, they are available for use in connection with beverages at such times as desired.

The cabinet 115 is secured at one end on a flange 114 of the instrument panel 113, by bolted mounting element 96, and at the other end is secured by a strap 91, bolted to the dash 100. The mounting element 96 and strap 91 hold the cabinet 115 in the position shown, with the end having the entrance opening disposed in a more elevated normal position than the normal position of the opposite or closed end of the cabinet. The longitudinally extending lower and upper walls of the cabinet are therefore normally substantially inclined to a horizontal plane, and as previously stated, such an up-tilted disposition is advantageous as effecting a better thermally induced circulation of air in the interior storage compartment 116, of the cabinet.

This because of the fact that the uppermost space in the corner Z, Fig. 6, will be at an increased elevation relative to that of the lower corner X, by reason of such tilting of the cabinet and therefore warmer air rising from the space X towards the space Z will with greater velocity initiate a more rapid circulation than if the cabinet were disposed horizontally. The causes and benefits of air circulation in the refrigerator and cold storage cabinets are well known and need not be related here. In the cabinet of Fig. 6 the open end of the cabinet facing the usual glove compartment door 120 of the instrument panel is shown as closed by a plug closure element 98, 118 and 99, and having a handle secured to a latching plate 95 rotatably mounted on a screw 92 secured in a threaded bushing carried on the metal sheath for the insulated portion 98 of the plug closure element.

Co-operating latch elements 83 affixed to the cabinet and latch plate are adapted upon rotation of the handle 93 to securely press the peripheral flange of the plug element 98, into pressure maintained sealing engagement with a gasket 85, thereby compressed against a shoulder of the cabinet opening walls.

A plug closure element, as shown, is especially advantageous for use in the embodiment described, since such element must be inserted and withdrawn through the door 120, which is of limited size and of a form predetermined by the available space and custom in the trade.

The ice trays 117 and 117a of Figs. 6 and 7, are preferably provided with a sealing gasket shown at 111, with a sheet metal lid or cover 86 clamped securely down on the gasket by any suitable means, such as the cover hook and tray flange at one end and the pressure creating latch at the other end of the tray.

Spring means, 119 attached to the cover 86, creates frictional restraint to undesired movements of the trays in the cabinet, which otherwise, due to movements of the vehicle, would cause wear and undesirable noise, audible to occupants of the vehicle.

It is to be noted that the ice tray of my present invention, as shown in all the figures herein, is disposed at an incline to the horizontal and that such angular disposition of the tray in the cabinet is of great advantage in that it will prevent rattling of the tray, since the angular disposition of the tray prevents its movement.

Further, the spring 119, as above described, supplements the angular disposition of the tray to further prevent rattling and jolting movement of the tray. Of course, it is to be understood that the same advantages of elimination of rattling and jolting described above in connection with ice trays placed in heat insulated cabinets supported in an inclined position, are also achieved in the use of other kinds of receptacles placed in similar inclined cabinets, as for instance, the receptacle illustrated in the embodiments of Figs. 1 to 5, inclusive.

For the purpose of conveying a better understanding of the foregoing descriptions certain terms employed herein will now be defined with respect to the meaning which I intend to convey by use of such terms in this specification and following claims.

By the use of such terms as "longitudinally extending" relative to my heat insulated cabinet, which is placed below the cowl of an automobile, I mean the placing of this cabinet in such a position that the entrance opening thereof, is directed generally towards the rear of the car, while the opposite closed portion is directed generally towards the front of the car.

By "rear" of my heat insulated cabinet I mean the open portion, and by "front" the opposite closed portion of the cabinet.

By "height" of my heat insulated cabinet I mean the distance between the upper and lower walls of the interior compartment.

By "width" I mean the distance between the left and right walls of the interior compartment.

By "depth" I mean the distance between the front and rear ends of the closed interior compartment.

I also desire to mention that the words "instrument board" and "instrument panel" as used herein, are synonymous.

I am aware that further numerous and extensive departures of various kinds may be made from the embodiments herein illustrated and described, but without departing from the spirit of my invention.

I claim:

1. The combination with an automotive vehicle having an instrument panel, a cowl, a front wall separating the passenger compartment from the engine compartment of the vehicle, of a cabinet disposed within the space below the cowl and between the said instrument panel and the wall, and supported by said vehicle, said cabinet having an interiorly disposed heat insulated compartment of lesser height than depth, comprising longitudinally extending walls substantially downwardly inclined from a horizontal plane whereby said compartment and said cabinet are disposed on an inclined plane, whereby a continuous thermally induced circulation of air will be effected between one end bottom corner and the opposite upper corner of the compartment, and said cowl comprising a portion disposed in superposed spaced relation to said cabinet and being generally disposed on an inclined plane to said panel.

2. The combination of a heat insulated cabinet having a longitudinally extending storage compartment therein, an automotive vehicle including a dash, cowl, and an instrument panel, means for securing the cabinet beneath the cowl and between the instrument panel and dash in downwardly inclined position from the panel with the vehicle in a normal horizontal position, the compartment having an open end facing the rear of the vehicle, heat insulated cover means for the cabinet adapted to be locked therewith to close the compartment, and an opening through the instrument panel permitting access to the cover means, and said cowl comprising a portion disposed in superposed spaced relation to said cabinet and being generally disposed on an inclined plane to said panel.

3. The combination with an automotive vehicle including a dash, a cowl, an instrument panel, and a heat insulated cabinet having a storage compartment therein, the cabinet being disposed beneath the cowl and between the dash and instrument panel, means securing the rearward portion of the cabinet to the instrument panel and inclined downwardly towards the dash of the vehicle when same is in a normally horizontal position, means securing the front portion of the cabinet to the dash, the instrument panel having an opening therethrough permitting access to the cabinet, and closure means for said opening, and said cowl comprising a portion disposed in superposed spaced relation to said cabinet and being generally disposed on an inclined plane to said panel.

4. The combination with an automotive vehicle including a dash, a cowl and an instrument panel, of a heat insulated cabinet and refrigerating apparatus for cooling the cabinet, the cabinet and refrigerating apparatus being disposed beneath the cowl and between the dash and instrument panel, a housing enclosing the refrigerating apparatus, an evaporator for cooling the cabinet interior, the refrigerating apparatus including a compressor, and a condenser in circuit with the evaporator, the condenser forming a portion of the housing wall, and means for directing cooling air from the interior of the vehicle through the condenser into the housing, and said cowl comprising a portion disposed in superposed spaced relation to said cabinet and being generally disposed on an inclined plane to said panel.

5. The combination with an automotive vehicle including a dash, a cowl, an instrument panel, of a heat insulated cabinet disposed beneath the cowl and between the instrument panel and dash, a generally cup-form drip pan beneath the cabinet supported by the instrument panel and dash, means securing the cabinet to the drip pan in heat insulated relation, the cabinet having a longitudinally extending storage compartment therein opening toward the instrument panel, a storage compartment being provided in the cabinet with a base inclined downwardly towards the dash with the vehicle in a normal horizontal position, and heat insulated cover means for the compartment removable through an opening provided in the instrument panel, said drip pan being relatively shallow in its more rearwardly disposed portion and relatively deep in its more forwardly disposed portion, its upper rim being disposed substantially horizontally and its bottom wall being inclined, and said cowl comprising a portion in superposed spaced relation to said cabinet and substantially parallel thereto.

6. The combination with an automotive vehicle including an instrument panel, a cowl and an insulated cabinet and refrigerator apparatus for cooling the interior of the cabinet, the cabinet and refrigerator apparatus being disposed beneath the cowl and between the instrument panel and dash, the refrigerating apparatus adapted to be secured to a portion of the cabinet, and said cabinet adapted to be secured to the instrument panel and to the said cowl, and said cabinet being normally disposed at an angle to the horizontal, and said cowl comprising a portion disposed in superposed spaced relation to said cabinet and being generally disposed on an inclined plane to said panel.

7. In an automotive vehicle having a body, said body comprising a cowl, a panel depending from said cowl and a heat insulated cabinet supported by said body and positioned below said cowl substantially forwardly of said panel, said cabinet having a longitudinally extending storage compartment inclined relative to the normal horizontal position of the vehicle, a covered liquid receiving container disposed at an incline to a horizontal plane and adapted to be supported on the compartment base with an end of the container engaging the rear walls of the compartment, pressure means engaging the container and compartment walls to prevent relative movement therebetween, heat insulated cover means for the cabinet adapted to be locked therewith, and said cowl comprising a portion disposed in superposed spaced relation to said cabinet and being generally disposed on an inclined plane to said panel.

8. In an automotive vehicle having a body, said body comprising a cowl, a panel depending from said cowl and a heat insulated cabinet supported by said body and positioned below said cowl substantially forwardly of said panel, said cabinet having a longitudinally extending storage compartment therein, also normally inclined, and provided with an upwardly open end, a covered liquid receiving container adapted to be supported on the normally inclined compartment base, whereby the inner end of the container will tend to remain engaged with the rear wall of the compartment due to gravity, pressure means engaging the container and the compartment walls to aid the gravity action in preventing relative movement between the container and compartment, heat insulated cover means for the cabinet adapted to be locked therewith, and said cowl comprising a portion disposed in superposed spaced relation to said cabinet and being generally disposed on an inclined plane to said panel.

OSCAR U. ZERK.